I. KANTROWITZ.
DIE FOR MAKING ARTICLES FROM SHEET METAL.
APPLICATION FILED APR. 27, 1920.

1,368,731.

Patented Feb. 15, 1921.

Inventor.
Isaac Kantrowitz
By Frederick V. Winters
Attorney.

I. KANTROWITZ.
DIE FOR MAKING ARTICLES FROM SHEET METAL.
APPLICATION FILED APR. 27, 1920.
1,368,731.
Patented Feb. 15, 1921.
5 SHEETS—SHEET 2.
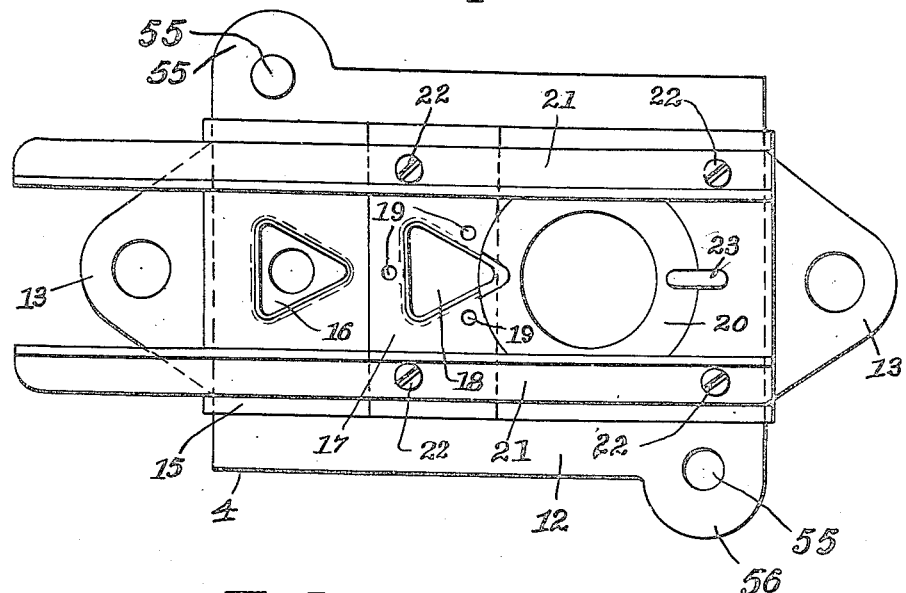
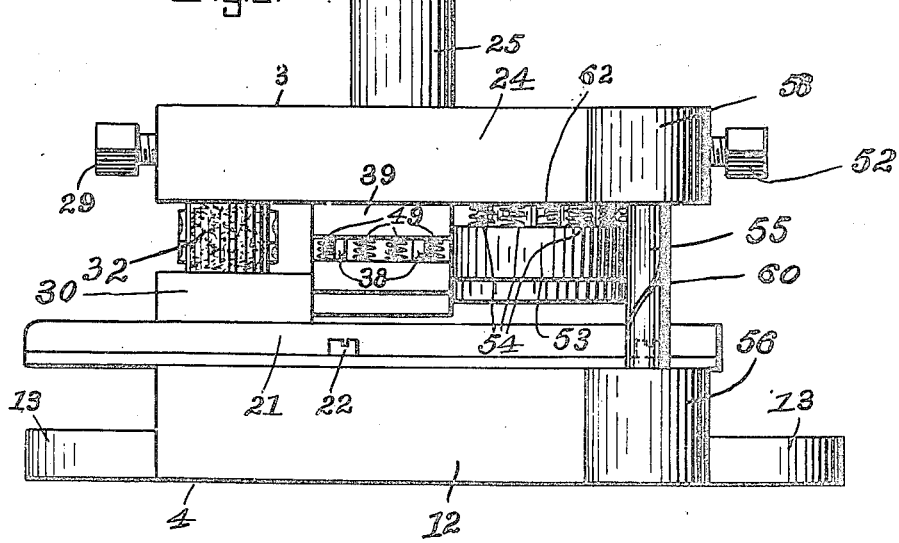
Inventor
Isaac Kantrowitz
By Frederick V. Winters
Attorney.

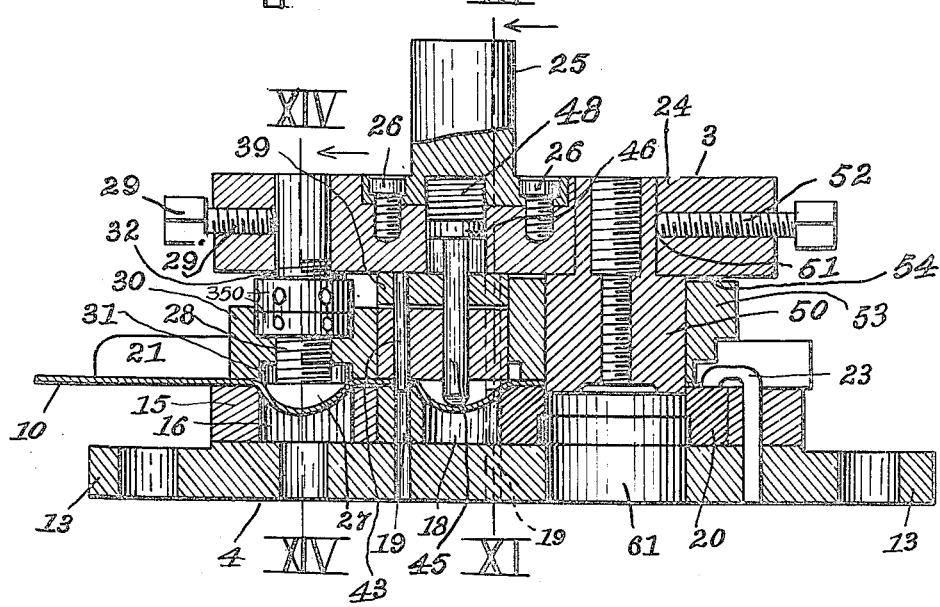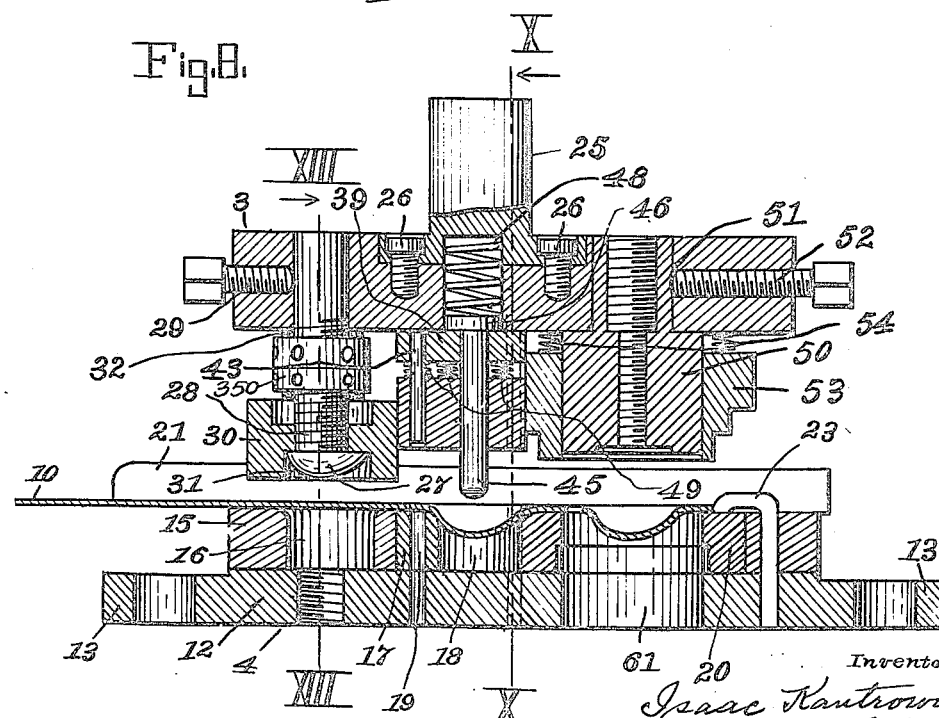

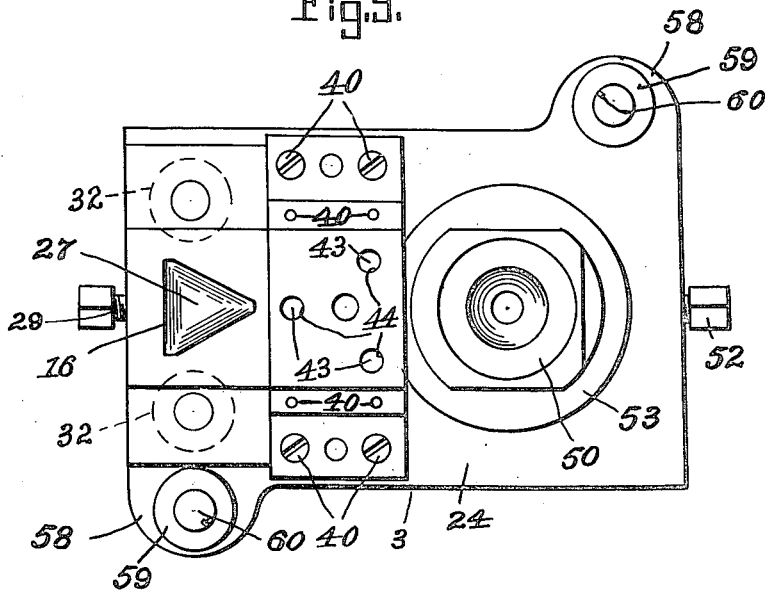
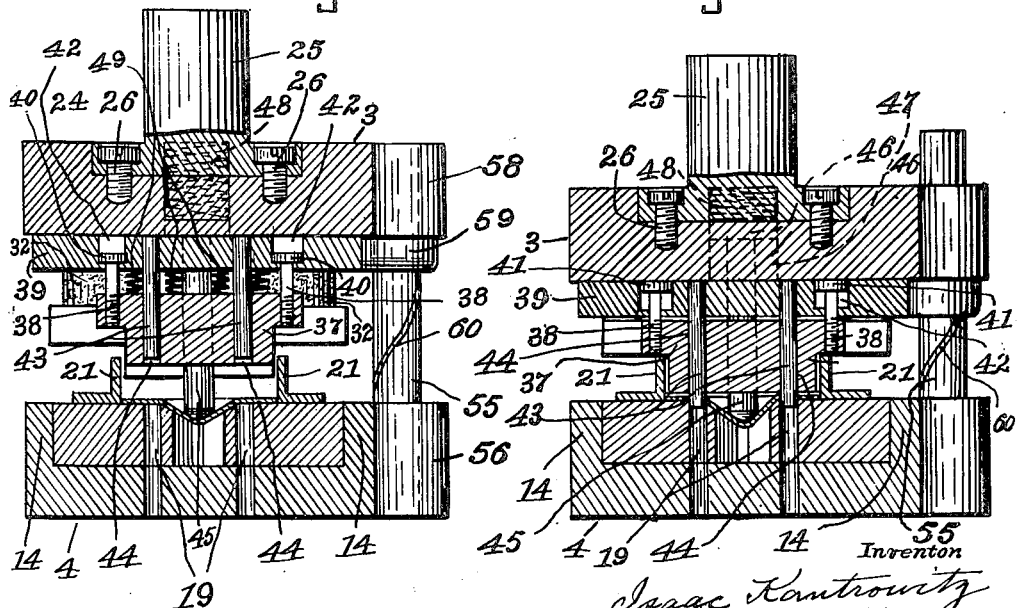

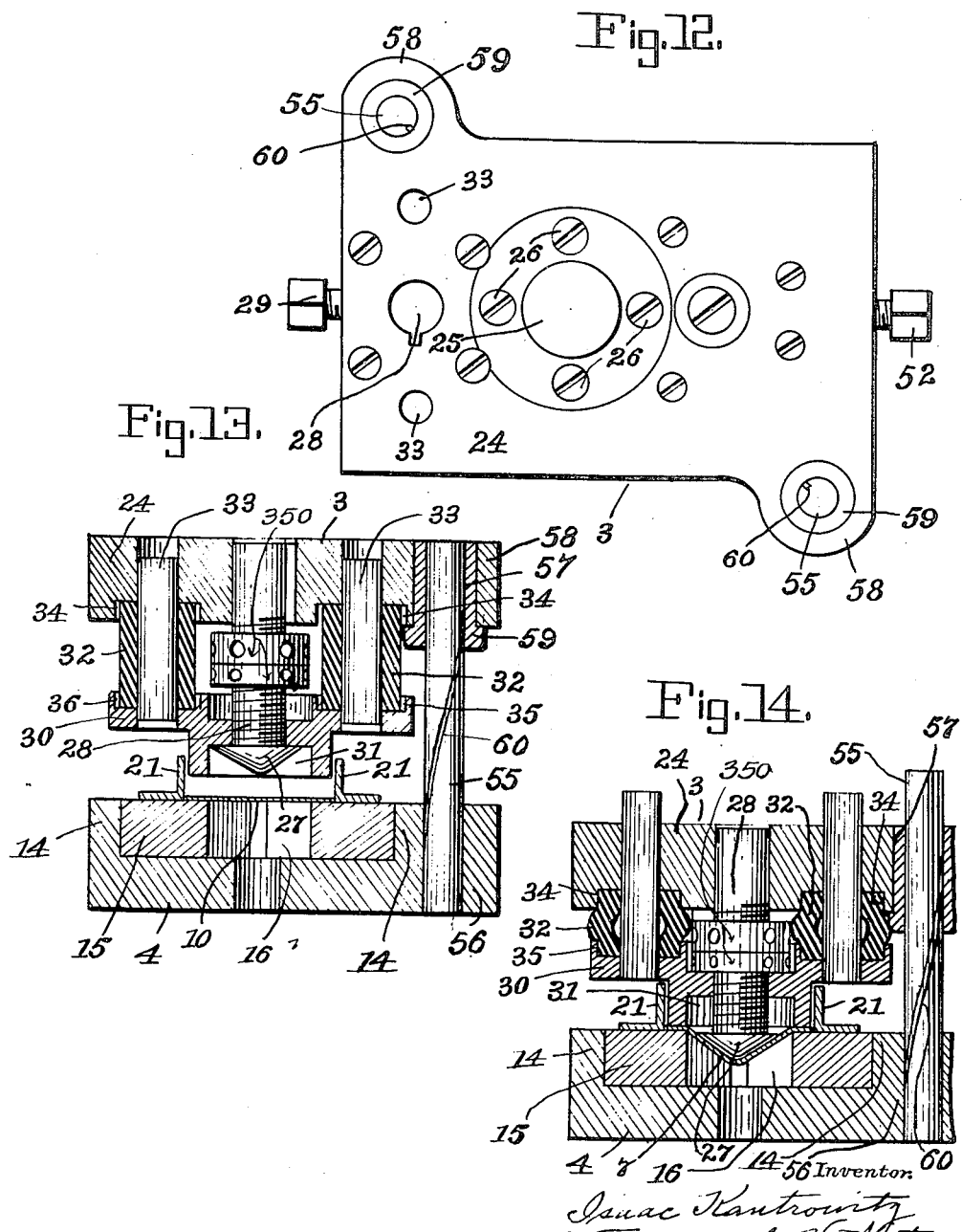

UNITED STATES PATENT OFFICE.

ISAAC KANTROWITZ, OF NEW YORK, N. Y.

DIE FOR MAKING ARTICLES FROM SHEET METAL.

1,368,731.　　　　　　Specification of Letters Patent.　　Patented Feb. 15, 1921.

Application filed April 27, 1920. Serial No. 376,937.

*To all whom it may concern:*

Be it known that I, ISAAC KANTROWITZ, a citizen of the United States, residing at New York, in the county and State of New York, have invented certain new and useful Improvements in Dies for Making Articles from Sheet Metal, of which the following is a full, clear, and exact specification.

This invention relates to dies for forming various articles from sheet metal blanks or strips but especially designed, as illustrated in the accompanying drawings, for the manufacture of corner shields for trunks or chests. The present dies are an improvement on those disclosed in Patent No. 1,161,628 issued November 23, 1915, and like said patented construction are adapted to shape the article in progressive stages and after the blank has been once fed through the dies a complete article is discharged at each stroke of the machine.

In the present apparatus the dies have their working parts made detachable so that new or different dies or punches may be substituted without necessitating that the entire dies be discarded, thus saving greatly in the expense of maintenance of a plant of this kind.

The present invention also has for its object to provide improved means for holding the blank during the punching and cutting out operations, said holding means being carried by the positive die along with the hole punches and cutting out punch and being pressed by springs so that they will yield when they engage the blank or negative die and while the punches are cutting said blank.

A further object of this invention is to provide improved means for guiding the positive die in its reciprocation toward and away from the negative die, one of said dies being provided with guide rods extending through passages in the other die, and the latter die having renewable bushings around said rods in said passages. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Fig. 5 is a plan view of the lower or negative die.

Fig. 6 is a side elevation of the assembled upper and lower dies, showing the upper or positive die on its up-stroke.

Fig. 7 is a longitudinal central vertical section of the assembled dies, showing the positions of the parts on the down-stroke of the upper die.

Fig. 8 is a similar view of the dies showing the upper die on its up-stroke.

Fig. 9 is an under plan view of the upper or positive die.

Figs. 10 and 11 are transverse vertical sections of the assembled dies on the line X—X of Fig. 8 and the line XI—XI of Fig. 7, respectively.

Fig. 12 is a plan view of the upper die, and

Figs. 13 and 14 are transverse vertical sections on the lines XIII—XIII and XIV—XIV of Figs. 8 and 7, respectively.

Figure 1:
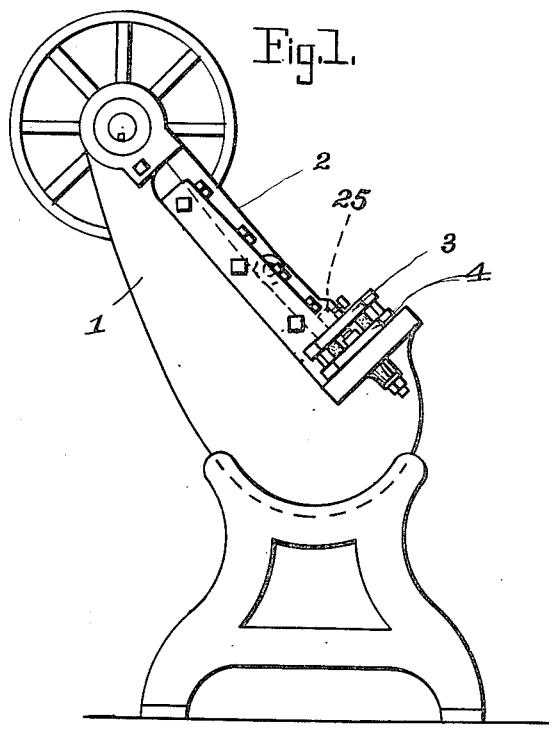
Figure 1 is a side elevation of a power press embodying the present improvements.

In Fig. 1 a power press is indicated at 1, the same having a reciprocatory plunger 2 to which the gang 3 of movable or positive dies are rigidly secured. The gang 4 of fixed or negative dies are fastened to the bed 5 of the press.

Figure 3:
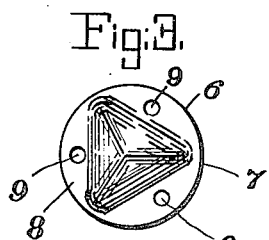
Fig. 3 is a plan view of a corner shield as made by the present dies.
Figure 4:
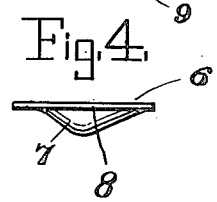
Fig. 4 is an edge or side elevation thereof.

While it is evident that the shape of the product may be varied by altering the contour of the dies, for the purpose of the present disclosure the dies may be adapted to form the article shown in Figs. 3 and 4, said article 6 having a depressed portion 7 adapted to fit over the corner of a trunk or chest, and a flange having a circular periphery surrounding said depression, as at 8. The flange 8 is perforated at 9, opposite the middle of each side of the triangular depression, for the passage of screws or nails to attach the article 6 in place. The three sections of the flange opposite the sides of the depression may be readily bent up to form continuations of said sides so as to lie flat against the sides of the trunk or chest when the article or corner piece is being attached. A stroke of a hammer will accomplish this prior to driving each securing nail or screw. The article may also be used for various other purposes, such as casters, door stops, furniture pads, etc.

Figure 2:
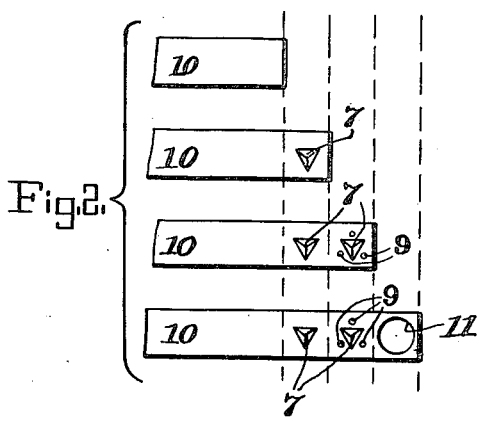
Fig. 2 is a diagrammatic representation in series of the successive steps involved in the production of the desired article.

As illustrated diagrammatically in Fig. 2, the forming of the depression 7, the cutting of the holes 9, and the severing of the article from the blank are accomplished initially in separate operations as the blank 10 is fed into the press between the dies. In this figure, the blank is shown at the top as it appears before entering the press. The second strip of the blank shows the first step of its advance with the depression 7 formed therein. The third strip of blank shows its second step with the holes 9 formed around the depression 7 and a second depression formed behind the first one. The fourth strip of blank in Fig. 2 shows the third step in the advance of said blank, where the completed article has been severed or punched out of the circular opening 11, the holes 9 have been punched around the second depression 7, and a third depression has been formed behind the second one. It will be seen that as the blank is further fed into the press step by step a completed article 6, such as is illustrated in Figs. 3 and 4, will be delivered at each stroke of said press.

The fixed, negative or female die gang 4 consists of a channel plate 12 having perforated ears 13 for securing the same to the bed of the press, and parallel vertical flanges 14 between which the removable die blocks are fitted. One of said die blocks 15 has a triangular passage 16 therein to receive the depressed portion 7 of the blank 10 when said depression is first formed. Another block 17 has a similar triangular passage 18 and cutting passages 19 at the sides thereof, while a third die block carries a removable ring-shaped cutting die 20. The blank 10 is guided in its passage over said die blocks by strips of angle steel 21 suitably secured in place as by the screws 22. A stop 23 may also be provided beyond the ring die 20 for arresting the blank in proper position for cutting out the finished article.

The positive, movable or male die gang 3 consists of a carrier plate 24 to the central portion of which a short stud 25 is secured by screws 26 for attachment to the reciprocatory plunger of the press. The die 27 for forming the depression 7 is made as a head on the lower end of a lug 28 which is removably secured to the plate 24 by a set screw 29, as best shown in Figs. 7 and 8. Fitted around the shank of the lug 28 is a presser block 30 having a cavity in its under surface at 31 to receive the die head 27 when the upper die gang is raised away from the lower die gang. Said presser block 30 is pressed downward by a pair of rubber tubular cushions 32 mounted around guide pins 33 and having their ends seated in sockets 34 in the lower surface of the carrier plate 24 and other sockets 35 in the upper surface of the presser block 30. The upward movement of the presser block under the action of the press may be regulated by a pair of locking nuts 350 threaded upon the shank of the lug 28. The upper surface of the presser block may be recessed at 36 to receive said adjustable nuts, as shown in Fig. 14, when the press is actuated.

Besides the presser block 30, another presser block 37 is supported on bolts 38, Figs. 10 and 11, from a plate 39 fastened to the carrier plate 24 by screws 40, Fig. 9. The heads 41 of the bolts 38 are seated in sockets 42 in the plate 39 and have vertical play therein to permit the presser block to recede under the action of the press. Depending from said plate 39 are three punches 43 which extend into passages 44 in the presser block 37 and are adapted to be projected below said block under the action of the press, as shown in Fig. 11, to punch out the holes 9 in the flange 8 of the article 6, said punches 43 entering the cutting passages 19 in the fixed die block 17. To hold the recessed portion 7 firmly in place in the passage 18 of said fixed die block 17, a presser foot 45 is provided, the same extending down through the plate 39 and presser block 37. The head 46 of said presser foot is seated in a socket 47 in the carrier plate 24, and is pressed by a spring 48 arranged in said socket above said head. The presser block 37 is pressed by springs 49 interposed between said block and the plate 39. Several of said springs 49 are preferably used, the same being spaced at intervals between the three punches 43 and around the presser foot.

To coöperate with the cutting die 20 of the fixed gang, a punch 50 is bolted at 51 to the carrier plate 24 of the movable gang, said punch being removably attached as a whole to said carrier plate by the set screw 52, Figs. 7 and 8. A presser block 53 is supported on bolts 62, Fig. 6, and surrounds said punch 50 and is pressed by springs 54 similar to the springs 49 and arranged at intervals around the punch and between said block and the carrier plate 24.

The upper gang of dies is guided in its reciprocations toward and away from the lower fixed gang by pins or rods 55 fast to lateral ears 56 on the fixed plate 12 and extending up through passages 57 in lateral ears 58 on the carrier plate 24 of said upper gang. Said passages 57 are fitted with renewable bushings 59 engaging around said guide pins or rods 55. When these bushings become worn they may be readily renewed without necessitating the provision of an entire new gang or carrier plate. The guide pins or rods are preferably provided with oil grooves 60.

In operation, the blank 10 is advanced step by step between the guide strips 21 by any suitable means or manually when the movable gang is raised. Then when said movable gang is lowered in the press the several operations already described will be accomplished on said blank by reason of the coöperation of said upper movable gang of dies with the lower fixed gang, as clearly illustrated in Fig. 7. It will be understood in this figure that the completed article 6, Figs. 3 and 4, has dropped through the passage 61 in the plate 12 and been discharged from the machine.

Having thus described my invention, what I claim as new and desire to secure by Letters Patent of the United States is:—

1. In a power press, the combination with a pair of coöperating dies, of a carrier plate to which one of said dies is connected in the press, a presser block mounted around said die, means for limiting the outward movement of said block, resilient means interposed between said block and carrier plate for pressing the block into contact with the work during the operation of the press, and adjustable means for limiting the inward movement of said block.

2. In a power press, the combination with a pair of coöperating dies, of a carrier plate to which one of said dies is connected in the press, said die having a shank, a presser block mounted around said shank, resilient means interposed between the block and carrier plate for pressing said block into contact with the work during the operation of the press, said block being limited in its outward movement on the shank, and an adjustable stop on the shank for limiting the inward movement of said block.

3. In a power press, the combination with a die having a reduced shank, of a presser block fitted around the reduced shank of said die and having a recess in its working face to house the die when the latter is withdrawn, the base of said recess being engaged by the inner face of the die in the withdrawn position of the latter, and resilient means for pressing said block into contact with the work during the operation of the press.

4. The combination with a pair of punching dies, of a punch carried by one of the dies, a presser block yieldingly mounted on the same die around the punch for holding the work at the edge during the punching operation, a presser foot extending through the presser block to hold the central portion of the work during the punching operation, and means for yieldingly pressing said foot into contact with the work independently of said presser block.

In testimony whereof I have signed my name to this specification.

ISAAC KANTROWITZ.